United States Patent
Li et al.

(10) Patent No.: US 10,906,743 B2
(45) Date of Patent: Feb. 2, 2021

(54) ROLLER AND LOCKING METHOD THEREOF

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Yuan Li, Beijing (CN); Yue Chen, Beijing (CN); Fei Zhang, Beijing (CN); Zhigang Song, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 112 days.

(21) Appl. No.: 15/955,148

(22) Filed: Apr. 17, 2018

(65) Prior Publication Data
US 2019/0062065 A1    Feb. 28, 2019

(30) Foreign Application Priority Data

Aug. 28, 2017   (CN) .................... 2017 2 1083910 U

(51) Int. Cl.
*B65G 39/09*  (2006.01)
*B65G 39/07*  (2006.01)
(Continued)

(52) U.S. Cl.
CPC ............. *B65G 39/09* (2013.01); *B65G 39/06* (2013.01); *B65G 39/07* (2013.01); *F16C 13/00* (2013.01);
(Continued)

(58) Field of Classification Search
CPC ........ B65G 39/09; B65G 39/07; B65G 39/06; F16C 13/02; F16C 13/00; F16C 2208/10; F16C 2326/58
(Continued)

(56) References Cited

U.S. PATENT DOCUMENTS 3,881,233 A * 5/1975 Schmidt ................ B21B 39/008
                                                                    492/40
4,242,782 A * 1/1981 Hanneken ............. C03B 35/163
                                                                    198/789
(Continued)

FOREIGN PATENT DOCUMENTS

DE        1931569 A1 * 9/1970 ............. B65G 39/02
DE     29920618 U1 * 2/2000 ............. B65G 39/07
(Continued)

OTHER PUBLICATIONS

"Patent Translate DE 1 931 569" EPO. (Year: 2019).*
"Patent Translate EP 1 873 110" EPO. (Year: 2019).*

*Primary Examiner* — Mark A Deuble
(74) *Attorney, Agent, or Firm* — Nath, Goldberg & Meyer; Joshua B. Goldberg

(57) ABSTRACT

The present disclosure provides a roller and a locking method thereof. The roller includes a main body, a first groove provided on an inner surface of the main body, and a first elastic component fitted with the first groove; wherein a through hole for receiving and fixing a shaft is provided on the first elastic component. The present disclosure can be used to lock shafts.

10 Claims, 2 Drawing Sheets

(51) Int. Cl.
  *B65G 39/06* (2006.01)
  *B65G 13/02* (2006.01)
  *F16C 13/02* (2006.01)
  *F16C 13/00* (2006.01)

(52) U.S. Cl.
  CPC .......... *F16C 13/02* (2013.01); *F16C 2208/10* (2013.01); *F16C 2326/58* (2013.01)

(58) Field of Classification Search
  USPC .................................. 193/37; 492/49, 53, 56
  See application file for complete search history.

(56) References Cited

U.S. PATENT DOCUMENTS

| | | | | |
|---|---|---|---|---|
| 4,312,444 A * | 1/1982 | Mushovic | .......... | B29D 99/0035 193/37 |
| 5,146,675 A * | 9/1992 | Ford | .......... | B65G 39/09 492/47 |
| 5,381,887 A * | 1/1995 | Emmons | .......... | B65G 39/02 193/37 |
| 5,607,039 A * | 3/1997 | Byers | .......... | B65G 39/06 193/37 |
| 5,813,961 A * | 9/1998 | Buchwald | .......... | B41F 31/26 101/148 |
| 6,250,220 B1 * | 6/2001 | Sainio | .......... | B65H 23/0256 101/228 |
| 6,438,841 B1 * | 8/2002 | Fuma | .......... | B29C 45/14622 264/269 |
| 2015/0075944 A1 * | 3/2015 | Guo | .......... | B65G 39/06 193/37 |

FOREIGN PATENT DOCUMENTS

| | | | | |
|---|---|---|---|---|
| EP | 1873110 A1 * | 1/2008 | ............. | B66B 7/047 |
| GB | 1577306 A * | 10/1980 | ............. | B65G 39/06 |

* cited by examiner

ROLLER AND LOCKING METHOD THEREOF

CROSS-REFERENCE TO RELATED APPLICATION

This application claims the priority of China Patent Application No. 201721083910.6, filed in China on Aug. 28, 2017, the entire contents of which are hereby incorporated by reference.

TECHNICAL FIELD

The present disclosure belongs to the technical field of rollers, and in particular relates to a roller and a locking method thereof.

BACKGROUND

In the prior art, there are mainly three types of locking methods for a roller: a tightening screw locking method, a thermal expansion locking method, and a set screw locking method. The conventional locking method is complicated, which increases the difficulty for staffs work and is inconvenient for staffs work. It is also inconvenient for the movement of a sealing roller on a shaft.

SUMMARY

The present disclosure involves a roller and a locking method thereof. The roller includes a main body, a first groove provided on an inner surface of the main body, and a first elastic component fitted with the first groove; wherein a through hole for receiving and fixing a shaft is provided on the first elastic component.

Optionally, the inner surface of the main body is provided with two of the first grooves.

Optionally, a shape of the first groove is selected from a group consisting of a circle, an ellipse, a triangle, and a rectangle.

Optionally, a material of the first elastic component includes rubber.

Optionally, the roller further includes a second elastic component, which is provided to surround an outer surface of the main body.

Optionally, the second elastic component is completely wrapped on the outer surface of the main body.

Optionally, a second groove is provided on the outer surface of the main body; the second elastic component is embedded in the second groove.

Optionally, the second elastic component protrudes from the second groove.

Optionally, a material of the second elastic component includes rubber.

Optionally, a material of the main body includes plastic or metal.

The present disclosure further involves a locking method for a roller as described above, including: embedding and fixing the first elastic component in the first groove provided on the inner surface of the main body; and sleeving the roller to a required locking position on the shaft through the through hole of the first elastic component.

DETAILED DESCRIPTION OF THE EMBODIMENTS

To enable those skilled in the art to better understand the technical solutions of the present disclosure, the present disclosure will be further described in detail below in conjunction with the accompanying drawings and specific implementation manners.

Embodiment 1

Figure 1:
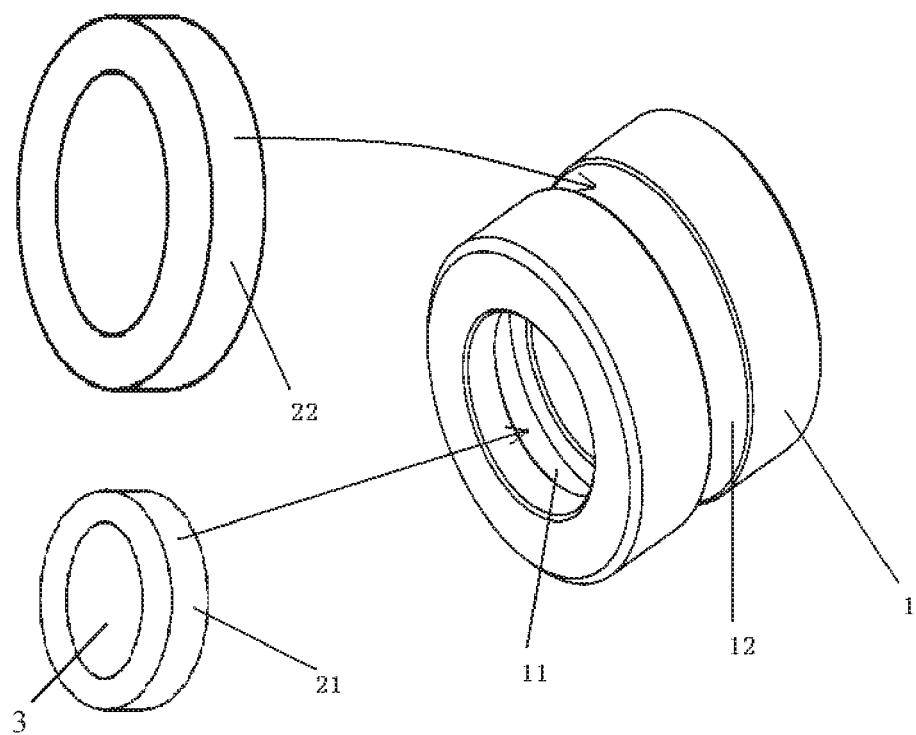
FIG. 1 is a perspective view of a roller according to an Embodiment 1 of the present disclosure.

As shown in FIG. 1, this embodiment provides a roller including a main body 1, a first groove 11, and a first elastic component 21. The first groove 11 is provided on an inner surface of the main body 1. The elastic component 21 is fitted with the first groove 11, that is, the elastic component 21 is embedded in the first groove 11. A through hole 3 for receiving and fixing a shaft is provided on the first elastic component 21.

Specifically, when the shaft is locked by the roller of this embodiment, firstly, the first elastic component 21 is embedded and fixed in the first groove 11 provided on the inner surface of the main body 1, and then the roller is set to a position where the shaft needs to be locked by the through hole 3 of the first elastic component 21. At this time, the shaft is held tight by making use of the stretchability (elasticity) of the first elastic component 21, so as to complete the locking to the shaft. When it is required to adjust a locking position of the roller on the shaft, the roller is directly pushed to an adjusted locking position on the shaft to complete the re-locking to the shaft. According to the foregoing method for locking the shaft with the roller of this embodiment, it can be seen that the method for locking the shaft with the roller in the present embodiment is simple and easy to operate. The following technical problems are solved: in the conventional arts, screws need to be tightened and loosened and the operation of installing and removing the rollers is troublesome when the shaft is locked by using the screw locking method and set screw locking method. Further, it also solves the problem of high difficulty for the staff.

It should be noted here that an inner diameter of the first elastic component 21 provided in the roller of the present embodiment is smaller than a diameter of the shaft to be fixed by 2 mm. Therefore, the first elastic component 21 and the shaft to be fixed are fitted with a manner of interference fit. At this time, the roller of the present embodiment makes use of the stretchability of the first elastic component 21 to fasten the shaft, so as to complete the locking to the shaft.

Optionally, two first grooves 11 are provided on the inner surface of the main body 1. Correspondingly, when the roller is used to lock the shaft each time, the first elastic component 21 may be two and embedded and fixed in each of the first grooves 11 respectively. It should be noted that, when there are two first grooves 11 in this embodiment, the number of the first elastic component 21 does not have to be two. The first elastic component 21 may be a plurality of groups of the elastic components with the same outer diameter, and each group of elastic components may include two elastic components with the same inner diameter. The rollers of the present embodiment may be used to lock a shaft with different diameters, and when locking the shaft with different diameters, only one group of elastic components needs to be replaced.

Definitely, one or more first grooves 11 may also be provided on the inner surface of the main body 1. The number of the first grooves 11 is related to the length of the main body 1 and the diameter of the shaft to be locked. In general, the longer the axial length of the main body 1 is, the more the number of the first grooves 11 can be provided. For the shaft to be locked with a large diameter, a roller with a larger number of the first grooves 11 should be chosen for locking thereto, and it can be ensured that the roller can firmly lock the shaft.

For example, a roller locks a shaft having a diameter of 40 mm and a length of 100 mm, wherein the total length of the main body 1 of the roller is 10 mm, and one first groove 11 should be provided on the inner surface of the main body 11. Correspondingly, when the roller is used to lock the shaft, only one first elastic component 21 should be used, and the first elastic component 21 is embedded and fixed in the first groove 11.

Optionally, the shape of the first groove 11 is selected from a group consisting of a circle, an ellipse, a triangle, and a rectangle. Definitely, the shape of the first groove 11 is not limited to the above, as long as the shape of the outer surface of the first elastic component 21 and the shape of the first groove 11 are consistent, so as to ensure that the first elastic component 21 can be embedded and fixed in the first groove 11. For example, when the first groove 11 is circular, correspondingly, the outer surface of the first elastic component 21 should also be designed in a circular shape when the shaft is locked with the roller.

Generally, in order to ensure the service life of the roller, the main body 1 is made of a hard material. However, when a cargo is delivered by the roller locked on the shaft, the cargo is bound to collide with the roller, and a friction occurs between the roller and cargo. Since the material of the main body 1 is hard, it leads to wear on the surface of the cargo and affecting the quality of the cargos. For this reason, in the present embodiment, a second elastic component 22 surrounding the outer surface of the main body 1 is optionally provided on the roller.

As an optional implementation, the second elastic component 22 is completely wrapped on the outer surface of the main body 1. That is, the second elastic component 22 is wrapped around the entire outer surface of the main body 1. Therefore, when using the roller locked on the shaft to deliver the cargo, since the surface of the roller is completely wrapped with the second elastic component 22. As a result, it is possible to prevent a large friction generated between the cargo and the main body 1 when the cargo collides with the main body 1 which results in wear on the surface of the cargo and affecting the quality of the cargos.

It should be noted that the manner in which the second elastic component 22 is wrapped around the outer surface of the main body 1 is not limited to a complete wrapping, and a portion of the outer surface of the main body 1 may be wrapped. For example, the second elastic component 22 is sleeved on a middle area of the outer surface of the main body 1, i.e., the second elastic component 22 only covers the middle area of the outer surface of the main body 1.

As a second optional implementation, a ring-shaped second groove 12 is disposed on the outer surface of the main body 1, and the second elastic component 22 is embedded in the second groove 12. Due to the arrangement of the second groove 12, the second elastic component 22 is trapped therein. It is possible to prevent the second elastic component 22 from being separated from the main body 1 due to friction with the cargo. Optionally, the thickness of the second elastic component 22 is greater than the depth of the second groove 12. That is, when the second elastic component 22 is embedded in the second groove 12, it protrudes from the second groove 12. With this arrangement, it is possible to completely avoid contact between the cargo and the outer surface of the main body 1 of the roller, thereby avoiding the problem of wear on the surface of the cargo caused by the outer surface of the main body 1.

It should be noted that the shape of the second groove 12 corresponds to the shape of the second elastic component 22, but the shape of the second groove 12 is not limited to the shape described above. For example, if the second elastic component 22 is in a spiral shape, the second groove 12 is also in a spiral shape.

Optionally, the first elastic component 21 and the second elastic component 22 are both made of rubber. The first elastic component 21 and the second elastic component 22 made of the rubber material have better stretching performance. Therefore, this kind of the first elastic component 21 and the second elastic component 22 not only can help the roller of the present embodiment to fully lock the shaft, but also can effectively reduce the wear (which affects the quality of the cargo) the roller performs on the surface of the cargo when using the roller of the present embodiment to deliver the cargos. Moreover, when it is required to adjust a locking position of the roller on the shaft, the roller is directly pushed to the adjusted locking position on the shaft to complete the re-locking to the shaft, which solves the problem of high difficulty for the staff.

Optionally, the main body is made of plastic or metal. For example, polyvinyl chloride, acrylonitrile-butadiene-styrene copolymers, aluminum, and the like. The main body made of plastic or metal is easy to perform injection molding.

In order to more clearly understand the purpose of the present embodiment, the following description will be given by taking two first grooves 11 and one second groove 12 as examples in the present embodiment.

Figure 2:
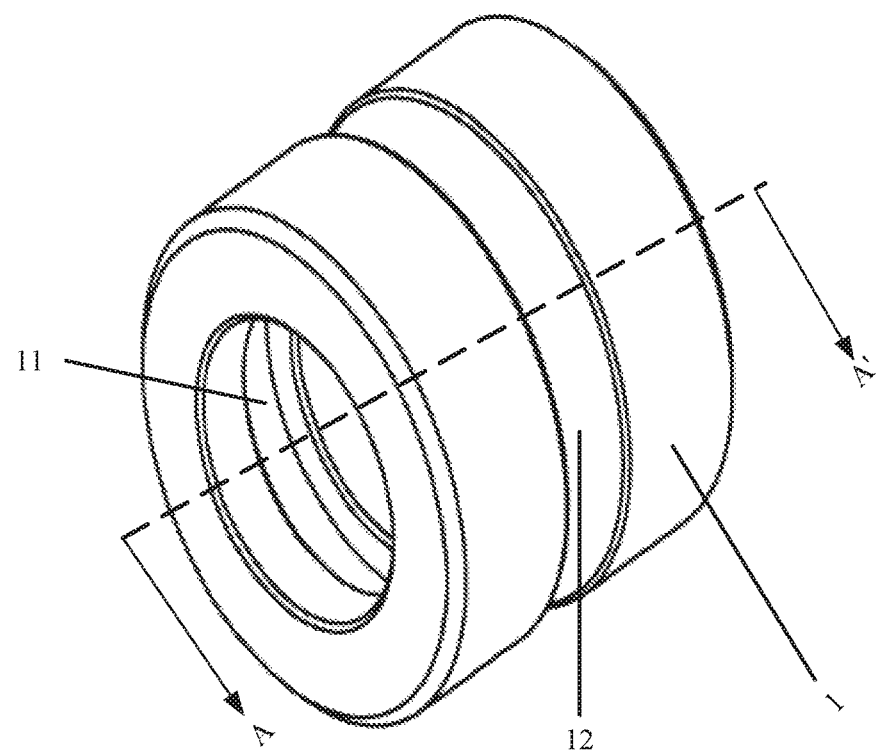
FIG. 2 is a perspective view of a main body in a roller according to Embodiment 1 of the present disclosure.
Figure 3:
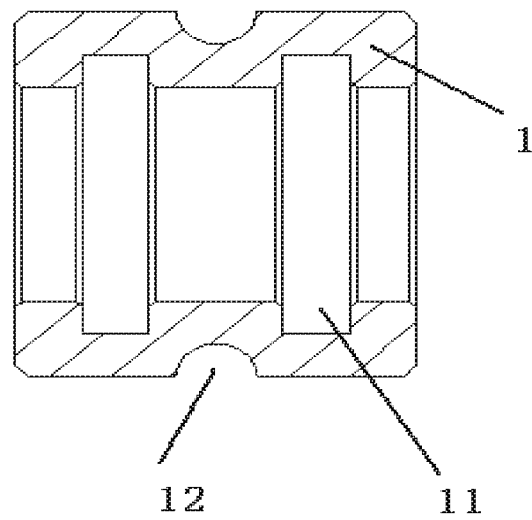
FIG. 3 is a sectional view of the main body of the roller according to Embodiment 1 of the present disclosure taken along line A-A' of FIG. 2.

As shown in FIG. 1 to FIG. 3, two arrows in FIG. 1 indicate that the first elastic component 21 is embedded and fixed in the first groove 11, and the second elastic component 22 is embedded and fixed in the second groove 12, respectively.

Specifically, the steps of using the roller of the embodiment to lock the shaft are as follows: in the first step, the two first elastic components 21 are embedded and fixed in the corresponding first groove 11 on the inner surface of the main body 1, respectively; in the second step, the second elastic component 22 is embedded and fixed in the corresponding second groove 12 on the outer surface of the main body 1; in the third step, the roller is sleeved to a required locking position on the shaft through the through hole of the first elastic component 21 so as to complete the locking to the shaft.

When it is required to adjust the locking position of the roller on the shaft, the roller is directly pushed to a predetermined adjusted locking position on the shaft. Therefore, the method of the present embodiment for locking the shaft with the roller is very simple and easy to operate. The following problems are solved: in the conventional arts, screws need to be tightened and loosened and the operation of installing and removing the rollers is troublesome when the shaft is locked by using the screw locking method and set screw locking method. It also solves the problem of high difficulty for the staff. Further, it achieves a technical effect that when the roller is used to deliver the cargos, the wear the rollers perform on the surface of the cargos is also reduced, thereby ensuring the quality of the cargos delivered by the rollers.

It can be understood that the above embodiments are merely exemplary embodiments employed to illustrate the principle of the present disclosure, but the present disclosure is not limited thereto. For a ordinary skilled person in the art, various modifications and improvements may be made without departing from the spirit and essence of the present disclosure, and these modifications and improvements are also considered to be within the protection scope of the present disclosure.

The invention claimed is:

1. A roller, including
   a main body,
   a first groove provided on an inner surface of the main body,
   a first elastic component fitted with the first groove; and
   a second elastic component, which is provided to surround an outer surface of the main body;
   wherein a through hole for receiving and fixing a shaft is provided on the first elastic component, the through hole of the first elastic component is configured to sleeve the roller to a required locking position on the shaft, the first elastic component is in direct contact with the shaft, and the first elastic component and the shaft are fitted with a manner of interference fit; and
   an inner diameter of the first elastic component is smaller than a diameter of the shaft by 2 mm, when it is required to adjust a locking position of the roller on the shaft, the roller is directly pushed to an adjusted locking position on the shaft to complete re-locking to the shaft.

2. The roller according to claim 1, wherein the inner surface of the main body is provided with two of the first grooves.

3. The roller according to claim 1, wherein a shape of the first groove is selected from a group consisting of a circle, an ellipse, a triangle, and a rectangle.

4. The roller according to claim 1, wherein a material of the first elastic component includes rubber.

5. The roller according to claim 1, wherein the second elastic component is completely wrapped on the outer surface of the main body.

6. The roller according to claim 1, wherein a second groove is provided on the outer surface of the main body; the second elastic component is embedded in the second groove.

7. The roller according to claim 6, wherein the second elastic component protrudes from the second groove.

8. The roller according to claim 1, wherein a material of the second elastic component includes rubber.

9. The roller according to claim 1, wherein a material of the main body includes plastic or metal.

10. A locking method for a roller as claimed in claim 1, including:
    embedding and fixing the first elastic component in the first groove provided on the inner surface of the main body; and
    sleeving the roller to a required locking position on the shaft through the through hole of the first elastic component.

* * * * *